Figure 1:
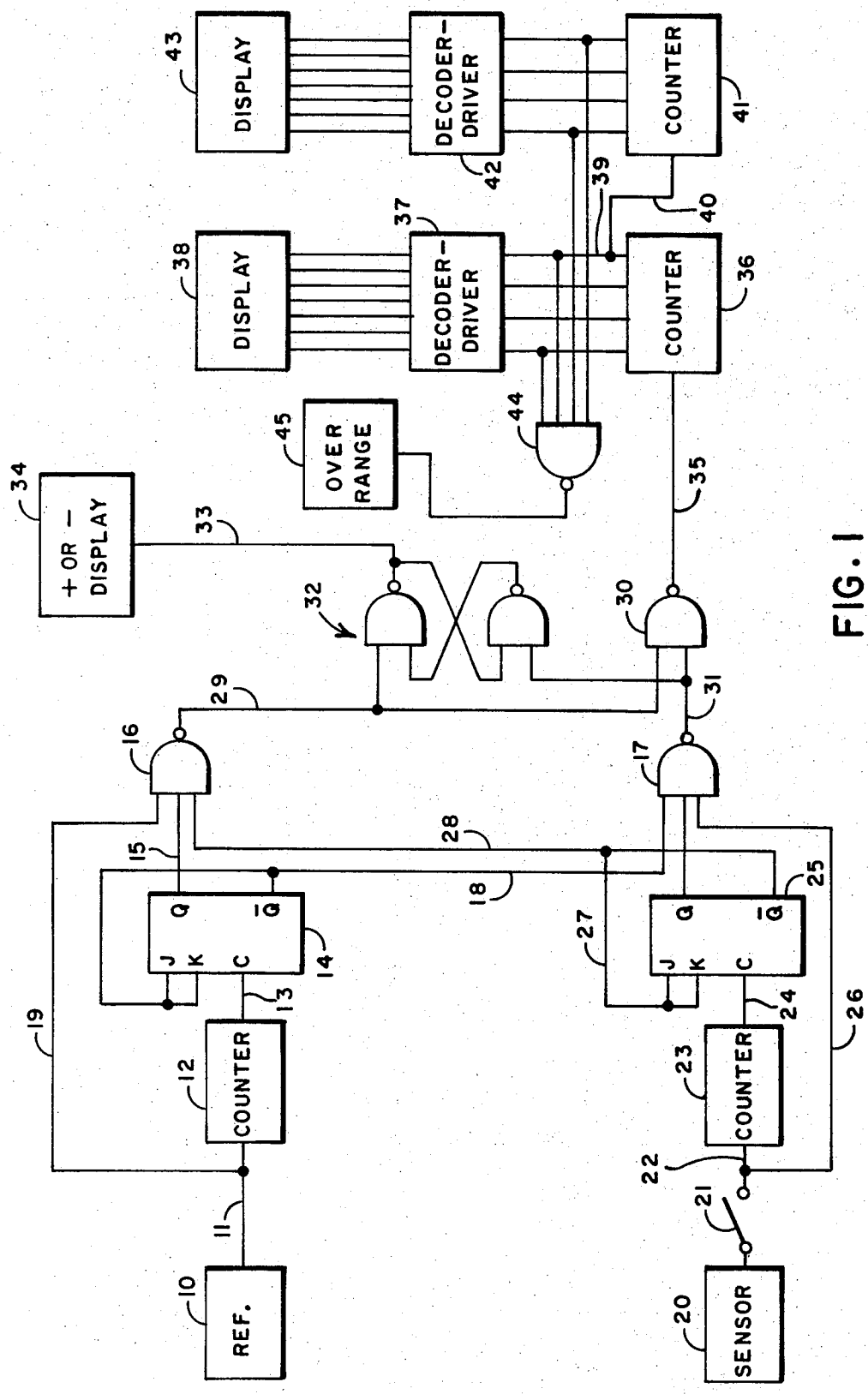

United States Patent [19]

Ratz

[11] 3,808,407
[45] Apr. 30, 1974

[54] PULSE DIFFERENCE COUNTER
[75] Inventor: James W. Ratz, Bloomington, Minn.
[73] Assignee: Honeywell Inc., Minneapolis, Minn.
[22] Filed: Oct. 13, 1972
[21] Appl. No.: 297,553

[52] U.S. Cl. ...... 235/92 FQ, 235/92 CC, 235/92 R, 324/79 D, 235/92 FP, 328/133
[51] Int. Cl. .............. H03k 21/32, G01r 23/02
[58] Field of Search ...... 235/92 TF, 92 FQ, 92 CC, 235/92 EA, 92 CP; 324/79 D; 328/133

[56] References Cited
UNITED STATES PATENTS

| | | | |
|---|---|---|---|
| 3,569,830 | 3/1971 | Gass et al. | 324/79 D |
| 3,626,307 | 12/1971 | Koyama | 328/133 |
| 2,851,596 | 9/1958 | Hilton | 235/92 TF |
| 3,419,880 | 12/1968 | Takano et al. | 235/92 TF |

Primary Examiner—Gareth D. Shaw
Assistant Examiner—Joseph M. Thesz, Jr.
Attorney, Agent, or Firm—Lamont B. Koontz; Trevor B. Joike

[57] ABSTRACT

A system for measuring the number of pulses by which a first pulse source exceeds a second pulse source, said pulses being measured over a predetermined interval, wherein said system responds to the first source which emits a selected number of counts, said source being thereafter connected to an output counter for counting said pulses, said system being de-energized when said other source emits said selected number of pulses to de-energize the counter. The counter thereby displays the number of pulses counted during that predetermined interval.

6 Claims, 8 Drawing Figures

PULSE DIFFERENCE COUNTER

BACKGROUND OF THE INVENTION

In many types of systems it becomes necessary to display or measure the error in the number of pulses emitted by at least two pulse sources. For instance, in U.S. Pat. application No. 298,038, filed Oct. 16, 1972, a system is described for providing an alarm whenever the number of pulses supplied by a sensor does not fall within pre-established limits. In such a system, it would be convenient and desirable to accurately measure the error between the pulses being supplied by the sensor and the pulses being supplied by a reference. The subject invention provides such a system.

SUMMARY OF THE INVENTION

A first pulse source, or reference source of pulses, is connected to a counter which provides an output pulse upon receiving a selected number of input pulses from said first pulse source, i.e., 1,000 input pulses. A second source of pulses, or a sensor providing pulses in accordance with a sensed condition, provides its pulses to a second counter which emits an output pulse upon receiving the same preselected number of input pulses, i.e., 1,000 input pulses. The counter which first reaches the count of 1,000 input pulses then energizes a selector circuit to thus connect that pulse source to an output counter which then counts the pulses from said source. When the other counter then reaches a count of 1,000, it de-energizes selector circuit and stops the output counter from counting the pulses from the source of pulses which first emitted 1,000 pulses. The count established by the output counter is displayed and gives an error indication of the difference in frequency of output pulses supplied by the two pulse sources.

Reset means are also provided to reset all counters and switches when a counting operation is first initiated, when a time delayed display has been completed, and/or when one of the pulse sources is interrupted prior to the completion of a counting operation. Further, the display may be interrupted, i.e., reset, whenever a second counting operation is to be conducted.

These and other features of the invention will become apparent from a detailed consideration of the specification in which:

FIG. I is a schematic diagram of the measuring circuit.

FIG. II is a schematic diagram of the circuit of FIG. I but including the reset circuitry.

FIG. III is a schematic diagram of the reset circuitry shown in FIG. II.

FIG. IV is a detailed diagram of the delay circuit shown in FIG. II.

In FIG. I, a first source of pulses is shown at 10 and may include the reference pulse source disclosed in copending the aforementioned application. The output from reference source 10 is supplied over line 11 to a counter 12 which is adapted to provide an output pulse upon receiving a predetermined number of input pulses from reference source 10, e.g., counter 12 may produce an output pulse upon receiving 1,000 input pulses. The output pulse from counter 12 is supplied over line 13 to the clock terminal of J–K flip-flop 14. The Q terminal of flip-flop 14 is connected by way of line 15 to one of the input terminals of NAND circuit 16. The inverted Q terminal of flip-flop 14 is connected to both the J and K terminals thereof and is also connected to NAND circuit 17 by way of line 18.

The output from the first pulse source 10 is also connected over line 19 to another of the inputs of NAND circuit 16. A second pulse source 20, for example the sensor shown in copending the aforementioned application is connected through a switch 21 over line 22 to the input of a counter 23 the output of which is connected over line 24 to the clock terminal of J–K flip-flop 25. Line 22 is also connected over line 26 to one input of NAND circuit 17. The inverted Q terminal of flip-flop 25 is connected to both the J and K terminals thereof by way of line 27 and is also connected over line 28 to the third and final input of NAND circuit 16. The Q terminal of flip-flop 25 is connected to the thrid and final input of NAND circuit 17.

The output from NAND circuit 16 is connected over line 29 to both an input of NAND circuit 30 and an input of latch 32 whereas the output from NAND circuit 17 is connected over line 31 to both another input of NAND 30 and the other input of latch 32. The output from latch 32 is connected over line 33 to a display apparatus 34. The output from NAND circuit 30 is connected over line 35 to the input of counter 36.

The counter 36 has a four line binary coded output which is connected to a decoder-driver circuit 37 having a seven terminal output connected to a seven segment display apparatus 38. The first line 39 of the four line binary coded output from counter 36 is connected over line 40 to the input of a second counter 41 which has a four line binary coded output connected to the input of the decoder-driver 42 having seven outputs connected to a seven segment display 43. A NAND circuit 44 has four inputs connected to the outputs of counters 36 and 41 and will respond to the number 99, a binary coded 9 appearing at the output terminals of each of the counters 36 and 41. When such a condition exists, an over-range indicator 45 will be energized by NAND circuit 44 to indicate that the output counter comprising counters 36 and 41 has received an input quantity of pulses too large to be displayed on display apparatus 38 and 43.

In operation, the counters 12 and 23 are designed to provide an output pulse after having received a preset number of input pulses, for example 1,000 input pulses. The Q terminals of flip-flops 14 and 25 are normally held at logic level 0 whereas the inverted Q terminals are normally held at logic level 1. Thus, one of the input terminals of each NAND circuit 16 and 17 will be driven alternately to a logic level 1 and a logic level 0 as its respective pulse source 10 and 20 produces output pulses. A second input terminal of these NAND circuits will be held at a logic level 0 by the Q terminal of its associated flip-flop circuit 14 or 25. The third input terminal of NAND 16 will be held at a logic level 1 by the inverted Q terminal of flip-flop 25 whereas the third input terminal of NAND circuit 17 will be held at a logic level 1 by the inverted Q terminal of flip-flop circuit 14.

Assuming that counter 12 first reaches a count of 1,000, it will emit an output pulse over line 13 to the clock terminal of flip-flop 14. Since the inverted Q terminal of that flip-flop holds the J and K terminals at a logic level 1, the Q and inverted Q terminals will change states thereby providing a logic level 1 on line 15 and a logic level 0 on line 18. Since lines 15 and 28 will both be a logic level 1, the pulses on line 19 from source 10 will then pass through NAND circuit 16 and be supplied to both the latch 32 and NAND circuit 30. Since the line 31 is at a logic level 1, 32 will operate the display apparatus 34 to a state wherein it is indicated that the reference sensor 10 is supplying the greater number of pulses. The pulses transmitted through NAND 16 are also transmitted through NAND 30 and operate the output counters 36 and 41.

As soon as the counter 23 reaches a count of 1,000, an output pulse is supplied therefrom over line 24 to flip-flop 25. Since the J and K terminals are held at a logic level 1 by the inverted Q terminal of flip-flop 25, the Q and inverted Q terminals will change state to supply a logic level — to NAND circuit 16 over line 28 which will prevent any further pulses from source 10 flowing through NAND circuit 16. The difference in the number of counts between the time when the reference source 10 emitted its 1,000 count and the sensor 20 emitted its 1,000 counts will be displayed from the counters 36 and 41 over display apparatus 38–43.

The counters 12, 23, 36 and 41 may be obtained under type number 7,490, the decoder-driver circuits 37 and 42 may be obtained under the type number 7,447A and the display apparatus 38 and 43 may be obtained under the type number 730 from Dialco.

It is quite apparent from FIG. 1 that the same operation will be performed if the source 20 is emitting more pulses than the source 10. This circuit can be useful in the type of system disclosed in copending the aforementioned application where the plurality of sensors are each connected through a switch to the common line which comprises the sensor 20 and switch 21. Thus, if an alarm indicator is energized in the system of the copending application, the appropriate sensor can be connected to the system of the present application to display a quantitative error.

The circuit of FIG. II is substantially similar to the circuit of FIG. I and therefore the same reference numerals are used in both to indicate the same structure. A reset circuit 50 is shown having inputs from line 11 and 22 and also from delay circuit 51. The reset circuit 50 produces an output over 74 which is used to reset both the counters 12 and 23 and is also inverted by inverter 52 to reset the J–K flip-flops 14 and 25. The output from inverter 52 is also connected over a line 53 to reset the over-range display apparatus 45. Another output 54 of the reset circuit 50 is used to reset the delay circuit 51. Finally, the output on line 74 is connected over line 55 to reset counters 36 and 41.

The reset circuit is used to reset the difference measuring circuit (a) at the start of a counting operation, (b) after a delayed display of apparatus 38 and 43, the delay being controlled by delay apparatus 51, and (c) if the switch 21 is opened during a counting operation. The reset circuit 50 also provides a reset to the delay apparatus 51 to interrupt the display, on apparatus 38 and 43, of the count stored in counters 36 and 41 if a new counting operation is to be begun at that time. The inputs from delay apparatus 51 are connected over lines 56 and 57.

The circuit of FIG. III shows in detail the reset circuit 50. The signal on line 22 is connected through an inverter 58 to the reset terminal of a counter 59 the input of which is connected over line 60 from the line 11. Line 22 is also connected over line 61 to the first input of NAND 62 which has its output connected to input 63 of NAND 64. The output 65 of NAND circuit 64 is connected to the other input 66 of NAND 62 whereas the other input 67 of NAND 64 is connected from the output of NAND circuit 68. The NAND circuit 68 has two inputs connected from the outputs of counter 59 adapted to operate the NAND circuit on a count of 10. The output 65 of NAND 64 is also connected to the input of a one shot multivibrator 69 which has a capacitor 70 and resistor 71 attached thereto to control the time delay of the output pulse. The output 65 is also connected to input 72 of NAND circuit 73 the other input of which is connected over line 56 from the delay circuit 51. The output from NAND 73 is connected to input 74 of NAND circuit 75. The NAND circuit 75 also has an input 76 connected from the output of the one shot circuit 69 and has a third input 77 connected over line 57 from the delay circuit 51. Finally, the one shot multivibrator 69 also has an output over line 54 which is fed to the delay circuit 51.

The circuit of FIG. IV, which is the delay circuit 51 shown in FIG. II will now be discussed before the operation of circuits FIG. III and FIG. IV are discussed.

As shown in FIG. II, delay circuit 51 has an input 76 connected from line 15 and an input 77 connected to the Q terminal of flip-flop 25. In FIG. IV, input line 76 is connected to one input of NAND 78 the other input of which is connected to line 77. The output is connected to a time delay circuit 79 which has a capacitor 80 to control the time delay thereof. The output pulse from the time delay circuit 79 is connected through an inverter 81 to line 56 and is also connected to the input of a one shot multivibrator 82 having a capacitor 83 and a resistor 84 to control the timing thereof. The output from the one shot multivibrator is connected to line 57.

Figure 2:
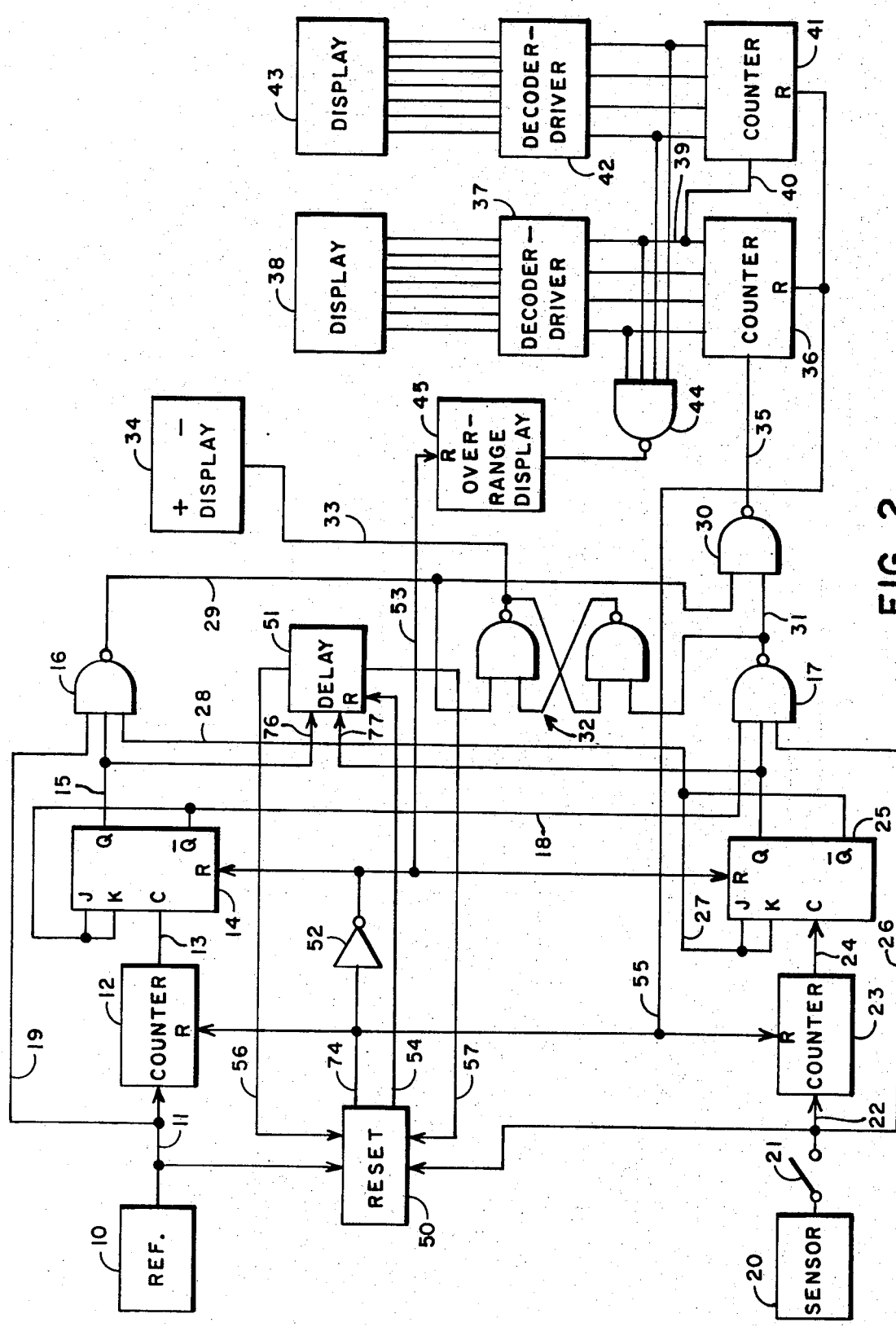
Figures 3, 4:
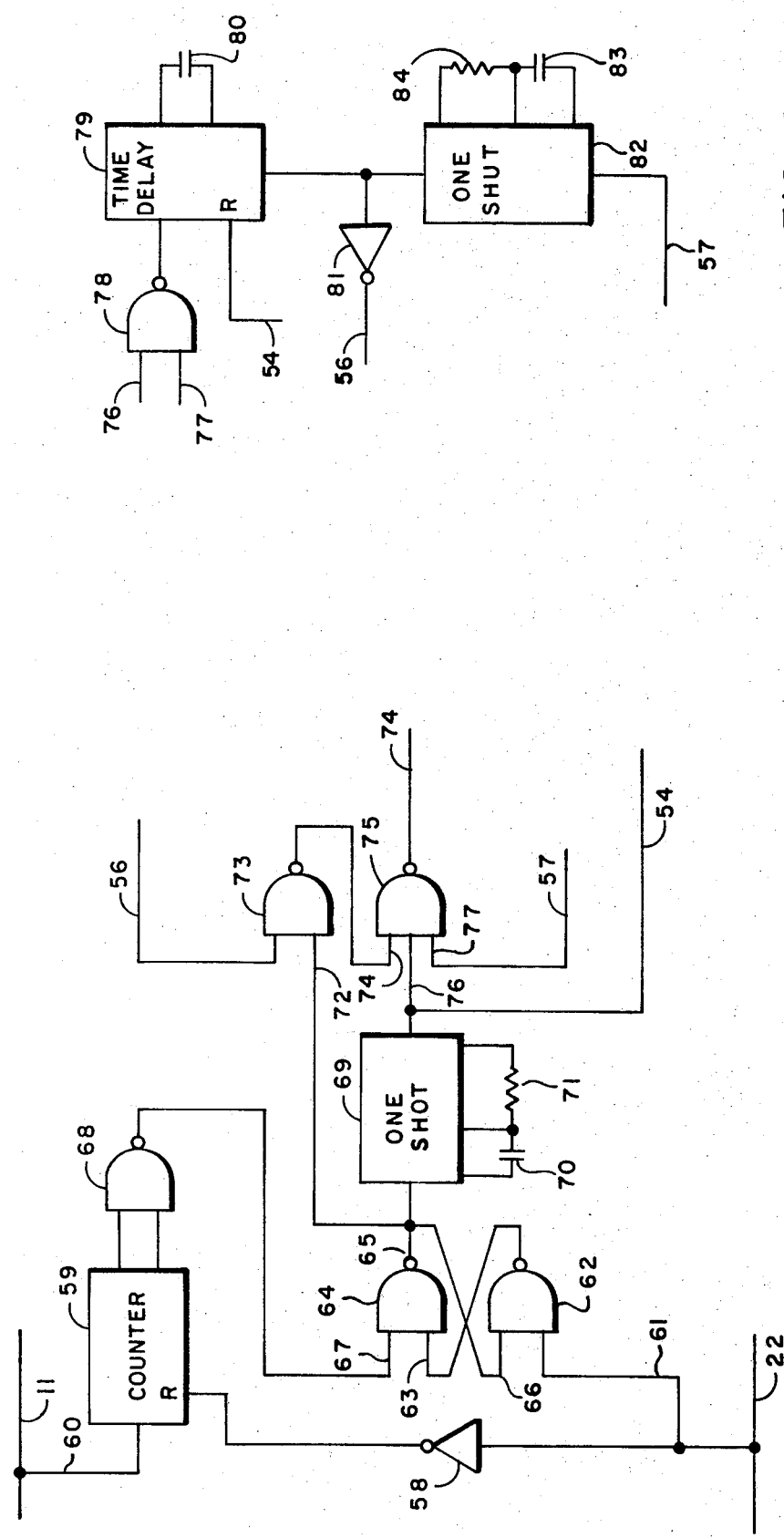

In operation, when it is desired to begin a counting operation, the switch 21 is closed which causes the pulses from source 20 to be inverted and fed to the reset terminal of counter 59 and also be supplied to input 61 of NAND circuit 62. Since counter 59 is continuously connected to the line 11, the pulses from inverter 58 will continuously reset the counter and prevent the NAND circuit 68 from emitting an output signal. The first pulse to be received by NAND circuit 62 over line 61 will cause the output 65 of NAND 64 to change states thereby activating the one shot multivibrator 69 to provide an output pulse to the input 76 of NAND circuit 75 all the inputs of which are normally held at a logic level 1. The pulse from multivibrator 69 will produce an output pulse over line 74 to reset counters 12, 23 and over line 55 to reset counters 36 and 41. It will also produce a pulse through inverter 52 to reset flip-flops 14 and 25, and to reset the over-range display 45. The output pulse from one shot multivibrator 69 is also connected over line 54 to the reset terminal of time delay circuit 79 to reset that delay circuit. Thus, upon the initial closing of switch 21 all of the apparatus of FIGS. 1 and 2 are reset to insure a correct indication of the error, if any, existing between the sources 10 and 21.

It is also desirable to provide a reset after the time delay apparatus 79 has held the display apparatus 38 and 43 energized for a predetermined length of time. From a review of FIG. II, it can be seen that input terminals 76 and 77 of NAND circuit 78 are normally held at logic level 0. The NAND circuit 78 will not change its output state until both inputs 76 and 77 are energized to a logic level 1. At this point, both counters 12 and 23 have reached their 1,000 count states and the output counter 36, 41 will have registered the error. Also at this state, both of the Q terminals of flip-flops 14 and 25 will be at a logic level 1 which will provide a change in the output from NAND circuit 78 which will initiate the time delay circuit 79. After the preset time delay, the circuit 79 will emit an output pulse which energizes one shot multivibrator 82 to supply a reset pulse over line 57 to input 77 of NAND circuit 75.

If the operator allows the switch 21 to open during a counting operation, the reset pulses to counter 59 will terminate allowing counter 59 to count out and operate NAND circuit 68 which will provide a signal to input 67 of NAND 64 which will cuase the output of NAND 65 to change states. However, since one shot multivibrator 69 only responds to a change of state of output 65 in only one direction, the one shot multivibrator 69 will not emit an output pulse, having already responded to the first pulse on line 61. However, the output 65 is also connected to input 72 of NAND circuit 73. The change in output of NAND 64 causes input 72 to become a logic level 1. The output from time delay circuit 79 is normally a logic level 0 which when inverted by inverter 81 holds line 56 at a logic level 1. Therefore, as soon as output 65 of NAND 64 goes to a logic level 1, the output terminal from NAND 73 will change states causing an output pulse over line 74.

Therefore, it can be seen that the reset circuit resets all of the appropriate apparatus to ensure that the count stored by the counter 36, 41 will be a true and accurate count of the difference in the number of pulses emitted by sources 10 and 20.

The embodiments of the invention in which an exclusive property or right is claimed are defined as follows:

I claim:

1. A system for measuring a number of pulses by which a first pulse source exceeds the second pulse source, said pulses being measured over a preselected interval, said system comprising:
   a first source of pulses;
   a first counter connected to receive said pulses from said first source of pulses for providing an output pulse upon receiving a predetermined number of input pulses;
   a second source of pulses;
   a second counter connected to receive pulses from said second source of pulses for providing an output pulse upon receiving said predetermined number of input pulses;
   output counter means;
   selector means connected to receive said output pulses from said first and second counters and being energized by the occurrence of the first of said output pulses to pass the pulses from the source associated with said counter emitting said first of said output pulses to said output counter, said selector means being de-energized by the second of said output pulses; and,
   reset means including means for resetting said first and second counters and said selector means and said output counter means when one of said first and second sources is interrupted before de-energization of said selector means.

2. The system of claim 1 wherein said reset means further comprises means for resetting said first and second counters, said output counter means and said selector means upon the initial energization of said system.

3. The system of claim 1 wherein said output counter means comprises an output counter and a display apparatus, wherein said system also further comprises delay means connected between said selector means and said reset means for resetting said first and second counters, said selector means, and said output counter means only after a delay upon said first and second counters emitting their output pulses.

4. The system of claim 3 wherein said reset means further comprises means for resetting said first and second counters, said output counter means and said selector means upon the initial energization of said system.

5. A system for measuring the number of pulses by which a first pulse source exceeds a second pulse source, said pulses being measured over a preselected interval, said system comprising;
   a first source of pulses;
   a first counter connected to receive said pulses from said first source of pulses for providing an output pulse upon receiving a predetermined number of input pulses;
   a second source of pulses;
   a second counter connected to receive pulses from said second source of pulses for providing an output pulse upon receiving said predetermined number of input pulses;
   output counter means;
   selector means connected to receive said output pulses from said first and second counters and being energized by the occurrence of the first of said output pulses to pass the pulses from the source associated with said counter emitting said first of said output pulses to said output counter, said selector means being de-energized by the second of said output pulses;
   display means for indicating which source produces the greater number of pulses; and,
   reset means including means for resetting said first and second counters, said output counter means and said selector means upon the initial energization of said system and when one of said first and second sources is interrupted before de-energization of said selector means.

6. A system for measuring the number of pulses by which a first pulse source exceeds a second pulse source, said pulses being measured over a preselected interval, said system comprising;
   a first source of pulses;
   a first counter connected to receive said pulses from said first source of pulses for providing an output pulse upon receiving a predetermined number of input pulses;
   a second source of pulses;
   a second counter connected to receive pulses from said second source of pulses for providing an output pulse upon receiving said predetermined number of input pulses;
   output counter means;
   selector means connected to receive said output pulses from said first and second counters and being energized by the occurrence of the first of said output pulses to pass the pulses from the source associated with said counter emitting said first of said output pulses to said output counter, said selector means being de-energized by the second of said output pulses;

delay means connected to said selector means; and, reset means connected to said delay means for resetting said first and second counters, said selector means, and said output counter means only after a delay upon said first and second counters emitting their output pulses.

* * * * *